United States Patent [19]

Goel et al.

[11] Patent Number: 4,640,969
[45] Date of Patent: Feb. 3, 1987

[54] OXAZOLINE/POLYOL/POLYISOCYANATE POLYMERS AND PROCESS

[75] Inventors: Anil B. Goel, Worthington; Timothy A. Tufts, Columbus; Peggy A. Blackburn, Plain City, all of Ohio

[73] Assignee: Ashland Oil, Inc., Ashland, Ky.

[21] Appl. No.: 763,107

[22] Filed: Aug. 7, 1985

[51] Int. Cl.$^4$ .................. C08G 18/30; C08G 18/36
[52] U.S. Cl. ........................... 528/73; 528/74.5
[58] Field of Search .......................... 528/73, 94.5

[56] References Cited

U.S. PATENT DOCUMENTS

| | | | |
|---|---|---|---|
| 3,661,861 | 5/1972 | Hunsucker | 524/874 |
| 3,960,816 | 6/1976 | Jurisch | 528/246 |
| 4,028,312 | 6/1977 | Ball et al. | 528/73 |
| 4,558,114 | 12/1985 | Goel | 528/73 |

Primary Examiner—Herbert S. Cockeram
Attorney, Agent, or Firm—John F. Jones

[57] ABSTRACT

A process for preparing novel interpolymers by the interpolymerization of an oxazoline, a polyol and a polyisocyanate at a temperature in the range of from about 20° C. and at a pressure in the range of from about atmospheric up to about 50 atmospheres is described.

18 Claims, No Drawings

OXAZOLINE/POLYOL/POLYISOCYANATE POLYMERS AND PROCESS

This invention relates to a process for the preparation of interpolymers of oxazolines, polyols and polyisocyanates, to the novel interpolymers thus produced and to some applications for the novel interpolymers.

The reaction of a mono-oxazoline with phenyl isocyanate to give a monomeric product has been described in Ann. Chem. 698,167 (1966) by Nehring and Seeliger. U.S. Pat. No. 3,661,861 discloses the reaction of an oxazoline with a diisocyanate in a solvent to produce an air-drying coating material which forms a film by reaction with atmospheric moisture. No polymer prepared by the interpolymerization of an oxazoline, polyol and polyisocyanate has previously been described.

We have discovered that the interaction of oxazolines, polyols and polyisocyanates produces thermosetting polymers which are useful in polymer composites and particularly in reaction injection molding (RIM) applications. The novel thermosetting polymers produced in this process have good physical properties.

We have discovered that 2-alkyl oxazolines (mono or bis) of general Formula I will react rapidly with mixtures of polyols and polyisocyanates to give thermosetting polymers having good physical properties.

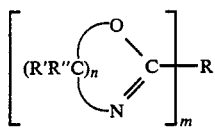

In Formula I n represents 2 or 3 and m represents 1 or 2 and when m is 1, R represents an alkyl group having from 1 to 20 carbon atoms and an alkaryl group having from 7 to 20 carbon atoms; when m is 2, R represents an alkylene group having from 1 to 19 carbon atoms and R' and R" independently represent hydrogen, an alkyl group having from 1 to 10 carbon atoms or an aryl group having from 6 to 12 carbon atoms.

The polyols useful in this invention include those having at least two hydroxyl groups per molecule and having equivalent weights falling in the range of from about 20 to about 5000. Such polyols include butane diol, cyclohexane dimethanol, tripropylene glycol, amide diols, urethane diols, polyether polyols such as poly (tetramethylene ether) diols, poly (propylene ether) polyols, polyester polyols, and the like.

Polyhydroxy polyethers are suitable and preferably those having at least 2 hydroxyl groups per molecule can be used. Polyhydroxy polyethers can be prepared by polymerization of epoxides such as ethylene oxide, propylene oxide, butylene oxide, tetrahydrofuran, styrene oxide, or epichlorohydrin either on their own or by chemical addition to other materials. Suitable other materials include ethylene glycol, propylene glycol, trimethylol propanes and 4,4 dihydroxy diphenyl propane. Sucrose polyethers also may be used. Polybutadienes having hydroxyl groups as well as other known hydroxyl containing vinyl addition polymerized polymers can be used.

According to this invention, hydroxyl containing polyesters, polythioethers, polyacetals, polycarbonates or polyesteramides of the types known for the formation of polyurethanes may also be used.

Particularly useful polyols for the present invention include the following representative aliphatic and aromatic polyhydric alcohols. Ethylene glycol, propylene glycol, trimethylene glycol, triethylene glycol, pentaethylene glycol, polyethylene glycol, 1,4-butanediol, diethylene glycol, dipropylene glycol, 2,2-dimethyl-1,3-propanediol, hexamethylene glycol, 1,4-cyclohexane dimethanol, xylene alcohols, ethyl resorcinol, propylene resorcinol, 2,4-dimethyl resorcinol, 3,6 dimethyl-1,2,4-benzene triol, dimethylol toluene, dimethylol xylene, bis-hydroxyethyl or bis-hydroxypropyl ethers of resorcinol, catechol, or hydroquinones, 1,5-dihydroxy naphthalene, 4,4'-isopropylidene-bis-phenol, and the like.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

The equivalent ratio of oxazoline to polyol should be in the range of from 1:99 to 95:5, respectively. The oxazoline group should be considered bifunctional towards isocyanate functionality. Thus, the equivalent amount of isocyanate functionality with respect to the combined hydroxyl and oxazoline functionality should be in the range of from 0.8:1 to 3:1, respectively.

Known polyurethane and isocyanurate catalysts such as organo tin compounds, tertiary amines, and the like can be included in the process of this invention. The polymers obtained from the simultaneous or sequential polymerization of oxazolines with polyols and polyisocyanates have been found to have high temperature resistance. The process and products of this invention can be used in the preparation of composite materials by impregnating a reinforcement such as glass fibers, graphite, etc. with monomeric or prepolymeric mixtures of these compositions.

Although the polymerization process of this invention can be carried out at room temperature or slightly below, it is within the scope of the invention to conduct the reaction at a temperature in the range of from 20 degrees C. to 200 degrees C. and at pressures in the range of from about atmospheric up to about 50 atmospheres.

Reactions of polyisocyanates with polyols result in polyurethane formation, whereas oxazoline reaction with isocyanates results in urea and amide group continuing polymeric material. Thus, in the instant polymeric system based on interaction of oxazoline/polyol/- polyisocyanate, polymers with urethane, amide and urea groups are found in the polymers. In addition to this, isocyanurate groups can be generated in the polymers by the use of known isocyanurate catalysts such as hindered tertiary amines, tetraalkylammonium salts and the like in the polymerization reaction.

Our invention is further illustrated in the following representative examples.

EXAMPLES 1–18

Several experiments were carried out in order to demonstrate the oxazoline/polyol/polyisocyanate reaction. The reactions were carried out in glass jars with thermocouple for recording the reaction temperature. The reactants were initially mixed at room temperature and left undisturbed in the jar for gellation to occur. The gel time was considered to be the maximum exotherm temperature. As can be seen from the results summarized in the Table, all the systems containing some oxazoline reacted at a much faster rate when compared with controls (Examples 1, 7, 11, 13 and 15 which are outside the scope of this invention) which did not contain oxazoline.

TABLE

| Example | Polyol (Grams) | Oxazoline (Grams) | Isocyanate (Grams) | Exotherm (°C.) | Gel Time (Min.) |
|---|---|---|---|---|---|
| 1 | B.D. (3.0) | — | 10 | None in 30 Min. | Greater Than 30.0 |
| 2 | B.D. (3.0) | 0.2A | 10 | 185 | 2.5 |
| 3 | B.D. (3.0) | 0.3B | 10 | 140 | 5.0 |
| 4 | B.D. (3.0) | 0.25C | 10 | 140 | 5.0 |
| 5 | B.C. (3.0) | 0.25D | 10 | 138 | 4.8 |
| 6 | B.D. (3.0) | 0.3E | 10 | 136 | 5.5 |
| 7 | T.P.G. (4.8) | — | 7.4 | None in 30 Min. | Greater than 30.0 |
| 8 | T.P.G. (4.8) | 0.25A | 7.6 | 129 | 5.0 |
| 9 | T.P.G. (4.8) | 0.25D | 7.6 | 128 | 5.8 |
| 10 | T.P.G. (4.8) | 0.4C | 7.8 | 132 | 4.9 |
| 11 | Teracol 650 (11.2) | — | 4.8 | None in 30 Min. | Greater than 30.0 |
| 12 | Teracol 650 (11.2) | 0.5A | 5.6 | 135 | 5.5 |
| 13 | BHED (8.0) | — | 3.8 | None in 30 Min. | Greater than 30.0 |
| 14 | BHED (8.0) | 0.5A | 4.6 | 138 | 5.0 |
| 15 | Polymeg 1000 (4.9) | — | 11.5 | None in 30 Min. | Greater than 30.0 |
| 16 | Polymeg 1000 (4.9) | 0.5A | 12.5 | 170 | 3.0 |
| 17 | Teracol 650 B.D. (3.0) (8.4) | 0.5F | 4.2 | 150 | 1.9 |
| 18 | Teracol 650 (8.4) | 0.6G | 4.2 | 79 | 7.5 |

In the Table B.D. means Butanediol; T.P.G. means tripropylene glycol; Teracol 650 means 334 hydroxyl equivalent weight poly(tetramethylene ether) diol; BHED means bis-hydroxy ethyl dimerized linoleic acid; Polymeg 1000 means 492 hydroxyl equivalent weight poly (tetramethylene ether) diol; A means 2-ethyl-2-oxazoline; B means 2-undecyl-4,4-dimethyl-2-oxazoline); C means mixture of 2,2'-dimethylene bis(4,4-dimethyl-1,2-oxazoline), 2,2'-trimethylen(4,4-dimethyl-2-oxazoline) and 2,2'-tetramethylene bis(4,4-dimethyl-2-oxazoline); D means 2,2'-tetramethylene bis (4,4-dimethyl-2-oxazoline); E means 2,2'-decamethylene bis(4,4-dimethyl-2-oxazoline); F means 2-hydroxypentyl-4-methyl-4-hydroxy methyl-2-oxazoline and G means 2-(methyl propylene) bis(2-oxazoline). The isocyanate used was liquid 4,4'-methylene bis(phenyl isocyanate).

EXAMPLE 19

2-Ethyl-2-oxazoline (40 g) and 33 g of poly (tetramethylene ether) diol (hydroxyl equivalent weight of 492) were mixed and degassed on a rotary evaporator. This solution was mixed rapidly with 130 g of degassed liquid 4,4'-methylene bis (phenyl isocyanate) (isocyanate equivalent weight of 144) and the resulting mixture was poured into a mold formed by two mold release agent coated parallel glass plates held apart by 1/8 inch spacers. The mold was kept in an oven at 100 degrees C. for one hour followed by postcuring for one hour each at 145, 165, 180 and 200 degrees C. The resulting solid opaque polymer sheet was found to have a notched izod impact strength (ASTM-D256) of 0.5 foot pounds/inch of notch and a heat distortion temperature (ASTM-D648) of 220 degrees C.

EXAMPLE 20

This example is for comparative purposes only and is outside the scope of the present invention. Following the procedure of Example 19 a polymer sheet was prepared from a mixture of 50 g of the oxazoline and 52 g of the polyisocyanate. The resulting sheet was found to be too brittle to be tested for its physical properties such as izod impact strength and heat distortion temperature.

EXAMPLE 21

The procedure of Example 19 was followed using 29.5 g of the oxazoline, 29.5 g of bis-hydroxy ethyl dimerized linoleic acid (hydroxyl equivalent weight of 320) in place of the poly (tetramethylene ether) diol, 0.3 g of a tertiary amine catalyst (N,N',N"-tris-(dimethyl amino propyl)hexahydrotriazine) and 108.5 g of the polyisocyanate. The resulting polymer sheet was found to have a notched izod impact of 0.5 foot pound/inch of notch, a heat distortion temperature of 205 degrees C., flexural strength (ASTM-D790) of 16,431 psi and a flexural modulus of 297,137 psi.

EXAMPLE 22

The procedure of Example 21 was followed using 31 g of the oxazoline, 62.1 g of the bis-hydroxy ethyl dimerized linoleic acid, 0.3 g of the catalyst and 116 g of the polyisocyanate. The resulting polymer sheet was found to have a notched izod impact strength of 0.5 foot pounds/inch of notch, a heat distortion temperature of 143 degrees C., flexural strength of 11,111 psi and flexural modulus of 201,544 psi.

EXAMPLE 23

A mixture of 14.8 g of the oxazoline, and 14.8 g of the polyol described in Example 21 was degassed and mixed with 54.3 g of the polyisocyanate of Example 21. This solution was used to impregnate 10 layers of a 4" wide and 6" long glass cloth. The impregnated cloth was placed between the surfaces of a steel mold about 1 to 2 psi was applied to the mold and the material was cured at 100 degrees C. for one hour followed by postcuring in the mold for one hour each at 140, 160, and 185 degrees C. The resulting reinforced composite material which contained 62% glass was found to have a notched izod impact strength of 13.3 foot pounds/inch of notch (hinged break), heat distortion temperature greater than 220 degrees C., flexural strength of 42,054 psi and a flexural modulus of 1,872,886 psi.

EXAMPLE 24

A glass reinforced composite was prepared by following the procedure of Example 23 using 14.8 g of the oxazoline, 13.2 g of poly (tetramethylene ether) diol (hydroxyl equivalent weight of 492) as the polyol and 54 g of the polyisocyanate. The resulting cured composite which contained 66% glass was found to have a notched izod impact strength of 15.3 foot pounds/inch C of notch (hinged break), a heat distortion temperature of greater than 220 degrees C., a flexural strength of 38,829 psi and a flexural modulus of 1,582,432 psi.

EXAMPLE 25

A solution of 40 g of the oxazoline, 33 g of the poly (tetramethylene ether) diol and 135 g of the polyisocyanate was prepared by the procedure of Example 19. This solution was injected onto a glass mat placed in a steel mold with Teflon liner and was cured for one hour each at 100, 140, 160 and 180 degrees C. The resulting polymer composite which contained 30% glass was found to have a notched izod impact strength of 8.3 foot pounds/inch of notch, a heat distortion temperature of greater than 210 degrees C., a flexural strength of 21,082 psi, and a flexural modulus of 601,241 psi.

We claim:

1. The process consisting essentially of interpolymerizing an oxazoline, a polyol and a polyisocyanate at a temperature in the range of from about 20° C. to about 100° C. at a pressure in the range of from about atmospheric up to about 50 atmospheres wherein the oxazoline is one conforming to the formula

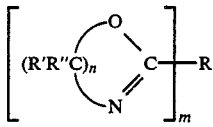

wherein n represents 2 to 3 and m represents 1 or 2 and when m is 1, R represents an alkyl group containing from 1 to 20 carbon atoms and an alkaryl group containing from 7 to 20 carbon atoms; when m is 2, R represents an alkylene group containing from 1 to 19 carbon atoms and R' and R" independently represent hydrogen, an alkyl group having from 1 to 10 carbon atoms or an aryl group containing from 6 to 12 carbon atoms.

2. The process of claim 1 wherein the equivalent ratio of oxazoline to polyol is in the range of from 1:99 to 95:5, respectively and the equivalent amount of isocyanate functionality with respect to the combined polyol hydroxyl and oxazoline functionality is in the range of from 0.8:1 to 3:1, respectively.

3. The process of claim 2 wherein the polyol is one having at least two hydroxyl groups per molecule and has an equivalent weight falling in the range of from about 20 to about 500.

4. The process of claim 3 wherein the polyisocyanate is an organic isocyanate having at least two isocyanate groups per molecule.

5. The process of claim 4 wherein the polyisocyanate is a diisocyanate.

6. The process of claim 5 wherein the polyol is butane diol and the oxazoline 2-ethyl-2-oxazoline.

7. The process of claim 5 wherein the polyol is butane diol and the oxazoline is 2-undecyl-4,4-dimethyl-2-oxazoline.

8. The process of claim 5 wherein the polyol is butane diol and the oxazoline is a mixture of 2,2'-dimethylene bis(4,4-dimethyl-2-oxazoline), 2,2'-tri-methylene bis(4,4-dimethyl-2-oxazoline) and 2,2'-tetramethylene bis(4,4-dimethyl-2oxazoline).

9. The process of claim 5 wherein the polyol is butane diol and the oxazoline is 2,2'-tetramethylene bis (4,4-dimethyl-2-oxazoline).

10. The process of claim 5 wherein the polyol is butane diol and the oxazoline is 2,2'-decamethylene bis(4,4-dimethyl-2-oxazoline).

11. The process of claim 5 wherein the polyol is tripropylene glycol and the oxazoline is 2-ethyl-2-oxazoline.

12. The process of claim 5 wherein the polyol is tripropylene glycol and the oxazoline is 2,2-tetramethylene bis(4,4-dimethyl-2-oxazoline).

13. The process of claim 5 wherein the polyol is tripropylene glycol and the oxazoline is a mixture of 2,2'-dimethylene bis(4,4-dimethyl-1,2-oxazoline), 2,2'trimethylene bis(4,4-dimethyl-2-oxazoline) and 2,2'tetramethylene bis(4,4-dimethyl-2-oxazoline).

14. The process of claim 5 wherein the polyol is poly(tetramethylene ether) diol and the oxazoline is 2-ethyl-2-oxazoline.

15. The process of claim 5 wherein the polyol is bishydroxyethyl dimerized linoleic acid and the oxazoline is 2-ethyl-2-oxazoline.

16. The process of claim 5 wherein the polyol is poly(tetramethylene ether) diol and the oxazoline is 2-hydroxy pentyl-4-methyl-4-hydroxy methyl-2-oxazoline.

17. The process of claim 5 wherein the polyol is poly(tetramethylene ether) diol and the oxazoline is 2-(methyl propylene) bis(2-oxazoline).

18. The polymer produced by the process of claim 1.

* * * * *